Sept. 7, 1937.              C. C. FARMER                 2,092,417
                    FLUID PRESSURE BRAKE CONTROL
                        Filed Oct. 16, 1936
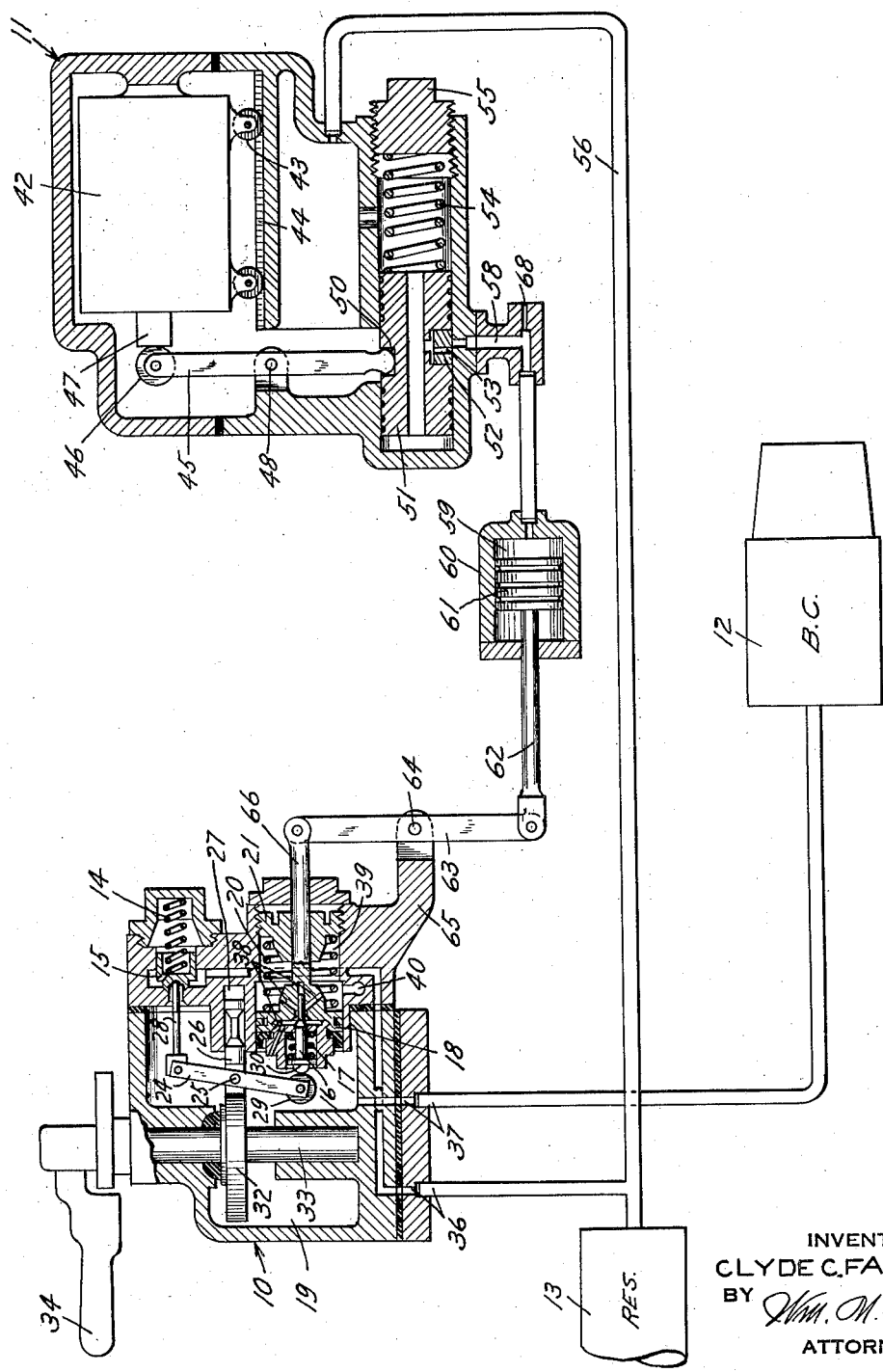
INVENTOR
CLYDE C. FARMER
BY Wm. M. Cady
    ATTORNEY Patented Sept. 7, 1937

2,092,417

UNITED STATES PATENT OFFICE 2,092,417

FLUID PRESSURE BRAKE CONTROL

Clyde C. Farmer, Pittsburgh, Pa., assignor to The Westinghouse Air Brake Company, Wilmerding, Pa., a corporation of Pennsylvania Application October 16, 1936, Serial No. 105,954

12 Claims. (Cl. 303—24)

This invention relates to fluid pressure brake control, and in particular to the control of fluid pressure brakes for railway vehicles.

A type of engineer's brake valve device developed within recent years, which possesses marked advantages over the older rotary type of brake valve, is that now commonly known as the self-lapping brake valve. An example of this type of brake valve is that illustrated and described in Patent 2,042,112, issued May 26, 1936, to Lynn and Bush, and assigned to The Westinghouse Air Brake Company. In this type of brake valve, a self-lapping valve mechanism operates in response to movement of a control handle, to supply fluid under pressure to a degree according to the degree or extent of movement of the handle into an application zone. The self-lapping mechanism will maintain this degree constant so long as the handle remains in the selected position. The degree may be also graduated in direct response to graduated movements of the handle in either an increasing or decreasing direction in the application zone.

A further development, which has taken place in recent years, is the employment of a device which operates in accordance with the rate of retardation of a vehicle to control the degree of the brake application. This device is usually adjusted to prevent the rate of retardation which may be produced by an application of the brakes from exceeding some limiting value, the device operating at this limiting value to modify the degree of the application so as not to exceed the limiting value. This device has been quite successful in practice, but, when applied to fluid pressure brake systems, has not been capable of producing the precise graduated control characteristic of the self-lapping brake valve device.

When a self-lapping brake valve device is provided for manual control by an operator, it is desirable that, if a retardation controller device is also provided, it exercises the same precise control over the brake application as exercised by the self-lapping brake valve device, so that all of the advantages of self-lapping brake control will be realized throughout all stages of the brake application. It is accordingly a principal object of the present invention to provide a brake system in which the advantages of self-lapping control are obtained both as a result of manual control and as a result of retardation control.

A further and more specific object of the invention is to provide a brake system having a manually operated self-lapping brake valve device and a retardation controller device, in which the retardation controller device coacts with the self-lapping brake valve device to so control the degree of the brake applications as to prevent any from producing a rate of retardation greater than a chosen limiting value.

Further and yet more specific objects of the invention will be quite apparent from the following description, taken in connection with the attached drawing, which shows as its single figure an embodiment of the invention adapted to a simple fluid pressure brake system.

In the drawing I have indicated a self-lapping brake valve device at 10, a retardation controller device at 11, a brake cylinder at 12, and a supply reservoir at 13.

The self-lapping brake valve device is provided with two valves, a supply valve 15 and a release valve 16. The supply valve 15 is urged toward a seated position by a spring 14, whereas the release valve 16 is urged toward an unseated position by a spring 17. The release valve 16 is carried by a movable abutment 18 in the form of a piston subject on one side to pressure of fluid in a pressure chamber 19, and on the other side to the pressure of a regulating spring 20. The tension on the regulating spring 20 may be manually adjusted by an adjusting nut 21.

For operating the supply and release valves, there is provided a lever mechanism comprising spaced levers 24, pivotally mounted intermediate their ends at 25 to a plunger 26 slidable in a bore 27 in the valve device casing.

Carried between the upper ends of the spaced levers 24 is a stem 28, which projects into a recess in the supply valve 15. Carried between the lower ends of the spaced levers 24 is a roller 29 which engages a rounded end 30 of the release valve 16.

Engaging the exposed end of the plunger 26 is a cam 32 rigidly secured to an operating shaft 33. The shaft 33 is rotatable in bearings formed in the brake valve casing, and has secured to its upper end a handle 34, which is employed to rotate the shaft 33 as the handle 34 is moved from a release position into an application zone.

When the handle 34 is in the release position, the parts of the brake valve device are positioned as shown. When the handle 34 is moved into the application zone, the shaft 33 and cam are rotated to a degree dependent upon the degree of movement of the handle 34 into the application zone. The cam 32 is so designed that, as the handle 34 is moved into the application zone, it progressively shifts the plunger 26 to the right, the plunger reaching its extreme right hand position when the handle 34 reaches the end of the application zone.

As the plunger 26 moves to the right, it, of course, carries with it the spaced levers 24. Now, due to the fact that the release valve spring 17 is weaker than the supply valve spring 14, the spaced levers 24 will first fulcrum about their upper ends and, as the plunger 26 moves to the right, shift the release valve 16 to seated position. When the release valve is thus seated, the spaced levers 24 fulcrum about their lower ends to unseat the supply valve 15 against the bias of its spring 14. During this operation the regulating spring 20, which is a relatively heavy spring, is unappreciably compressed.

The degree to which the supply valve 15 is unseated depends upon the degree of movement of the plunger 26 to the right, and hence according to the degree of movement of the handle 34 into the application zone.

Now the supply valve 15 controls the supply of fluid under pressure from the reservoir 13 to the pressure chamber 19, by way of pipe and passage 36. The pressure chamber 19 is connected to the brake cylinder 12 by way of pipe and passage 37, so that, with the supply valve unseated, fluid under pressure will flow from the reservoir 13 to the brake cylinder 12.

As the pressure builds up in the brake cylinder 12 and chamber 19, it acts on the face of the movable abutment 18 exposed to the chamber 19, and progressively moves the movable abutment to the right against opposition of the regulating spring 20. As the movable abutment moves to the right, the spaced levers 24 will rock about the pivot 25, due to action of the supply valve spring 14. When the movable abutment has moved far enough to the right for the supply valve 15 to be seated, the supply of fluid under pressure to the chamber 19 and brake cylinder 12 will be cut off. This is the lapping operation of the valve mechanism.

If, for any reason, the pressure in the chamber 19 should increase to a greater degree, the movable abutment 18 will continue to move to the right, whereupon the release valve spring 17 will unseat the release valve 16, causing fluid under pressure to be released from the chamber 19 to the atmosphere, by way of a communication which includes passages 38, spring chamber 39, and exhaust port 40. The consequent reduction of pressure in chamber 19 which results will cause the movable abutment 18 to move back to the left until the release valve 16 is seated. It will be readily appreciated, therefore, that the self-lapping brake valve will maintain a pressure in the chamber 19 which is proportional to the degree of movement of the brake valve handle 34 into the application zone.

The retardation controller device 11 is embodied in a casing provided with a movable body 42 having secured thereto rollers 43, which are adapted to roll in a trackway 44. It is desired that the rollers 43 be provided with ball bearings, so as to make the movement of the body 42 as nearly frictionless as possible.

Secured within the casing of the device is a lever 45, which carries at one end a roller 46 adapted to engage a lug 47 on the body 42. The lever 45 is pivotally mounted to the casing at 48 intermediate its ends, and has its other end disposed in a recess 50 of a sliding member 51. The sliding member 51 is recessed to receive and move coextensive therewith a slide valve 52 having a small port 53 therein.

Adjacent one end of the sliding member 51 is a calibrated spring 54, which reacts between the end of the sliding member 51 and an adjusting nut 55.

The casing of the retardation controller device is preferably pressure tight, and is connected by a pipe 56 to the reservoir 13, so that the space within the casing is at the same pressure as the fluid in the reservoir 13, it being understood, of course, that the reservoir is maintained charged with fluid under pressure from a suitable source of supply (not shown).

When the retardation controller device is positioned on a railway vehicle, and the railway vehicle is at rest or traveling at a constant rate of speed, the spring 54, acting through the slidable member 51 and the lever 45, maintains the body 42 positioned as shown. When the vehicle is decelerating, the resulting force of inertia acts upon the body 42 to move it to the left, against the opposition of the spring 54, the degree of movement of the body 42 being proportional to the rate of deceleration.

If the rate of deceleration is great enough, the sliding member 51 will be shifted to a position where the port 53 in the slide valve 52 registers with a passage 58. Passage 58 leads to a chamber 59 in a cylinder 60. Disposed in the chamber 59 is a piston 61 having a stem 62 connected to one end of a lever 63. The lever 63 is pivotally mounted at 64 to a lug 65 projecting from the casing of the self-lapping brake valve device 10. The other end of the lever 63 is pivotally connected to a stem 66 formed integrally with, or attached to, the movable abutment 18 in the self-lapping brake valve device.

Now it will be obvious that, when fluid under pressure is supplied to the piston chamber 59, the lever 63 will be rocked in a clockwise direction to cause the movable abutment 18 to compress the regulating spring 20. The degree of compression of the spring 20, due to the rotation of lever 63 by the piston 61, will, of course, depend upon the degree of fluid pressure existing in the chamber 59.

In the operation of the brake system disclosed, the pressure in the chamber 59 is normally maintained at atmospheric pressure due to the communication formed between the chamber and the atmosphere by a small restricted port 68. This will be the usual condition when the brakes are released and the vehicle is being propelled under power, or coasting.

When it is desired to effect an application of the brakes, the brake valve handle 34 is turned to some position in the application zone according to the desired degree of application of the brakes. The self-lapping valve mechanism of the brake valve device will then function to supply fluid under pressure to the brake cylinder 12 to a degree dependent upon the extent of movement of the brake valve handle 34 in the application zone, as previously described. The pressure produced in the brake cylinder will, of course, apply the brakes, and thus cause deceleration of the vehicle.

In response to deceleration of the vehicle, the body 42 in the retardation controller device 11 will move to the left, and, if the movement is sufficient to bring the port 53 in the slide valve 52 into registration with the passage 58, then fluid under pressure will be supplied at a low rate to the piston chamber 59. Before this takes place, however, the self-lapping valve mechanism in the brake valve device will have effected the lap of the supply to the brake cylinder 12, so that, by the time the retardation controller functions as just described, both the supply valve 15 and release valve 16 in the brake valve device will be seated.

As the pressure then slowly builds up in the piston chamber 59, the connected parts will be operated to cause the movable abutment 18 to move to the right to gradually compress the regulating spring 20. As the movable abutment moves to the right, it unseats the release valve 16 to effect, at a fairly rapid rate, a release of fluid under pressure from the brake cylinder 12. As the pressure in the chamber 19 drops, due to this release, the spring 20 will overcome the force acting to move the abutment 18 to the right, and permit it to move to the left to seat release valve 16 and thus again lap the supply to the brake cylinder.

The resulting reduction of brake cylinder pressure, of course, diminishes the degree of application of the brakes, and consequently diminishes the rate of retardation. The body 42 of the retardation controller device then moves to the right, shifting the slide valve 53 to the position where it blanks the passage 58. This, of course, cuts off communication between the reservoir 13 and the piston chamber 59, and permits the fluid in the chamber 59 to slowly escape to the atmosphere through the very small restricted port 68. The escape of fluid through the port 68 is at such a slow rate that, before the pressure in chamber 59 will have been appreciably reduced, it is expected that the vehicle will be stopped.

If now as the vehicle continues to reduce in speed the rate of retardation should increase, as due to an increase in the coefficient of friction between the brake shoes and vehicle wheels, the retardation controller device will repeat the operation just described, and again supply fluid under pressure to the piston chamber 59. This will result in a further release of fluid under pressure from the brake cylinder, to reduce the rate of retardation of the vehicle.

It will thus be seen that, in order to limit the rate of retardation of the vehicle, the retardation controller acts upon the self-lapping brake valve device to gradually modify brake cylinder pressure so as to prevent the rate of retardation from exceeding the desired limiting value. Due to the fact that the self-lapping valve mechanism exercises a precise control over brake cylinder pressure, the brake cylinder pressure may be graduated downwardly as the vehicle speed decreases to prevent the limiting rate of retardation from being exceeded.

In the foregoing description, it has been assumed that the initial degree of application of the brakes will be sufficient to bring the retardation controller device into action as described. Of course, if the degree of application is very light, the retardation controller device may not function to modify the operation of the brake valve device, but in general the operator will initially effect a full application of the brakes and depend upon the retardation controller device to graduate it downwardly as described.

While I have illustrated my invention with particular reference to a specific arrangement of devices, it is to be understood that I do not desire to be limited to this specific arrangement or otherwise than by the spirit and scope of the appended claims.

Having now described my invention, what I claim as new and desire to secure by Letters Patent, is:

1. In a vehicle brake system, in combination, a manually actuated self-lapping brake controlling valve device for controlling the degree of application of the brakes, and means operated according to the rate of retardation of the vehicle for controlling the operation of said brake valve device independently of its manual actuation.

2. In a vehicle brake system, in combination, a self-lapping brake valve device having a manually movable element and a valve mechanism operable to control the degree of application of the brakes according to the degree of movement of said element in an application zone, and means operated according to the rate of retardation of the vehicle for modifying the action of said self-lapping valve mechanism other than according to the movement of said element.

3. In a vehicle brake system, in combination, an engineer's brake valve device having an operating handle and a self-lapping valve mechanism operative to control the degree of application of the brakes according to the degree or extent of movement of said handle into an application zone, and means operated at a chosen rate of retardation of the vehicle for causing said self-lapping valve mechanism to operate to modify the degree of application of the brakes other than according to the degree of movement of said handle in said application zone.

4. In a vehicle brake system, in combination, a self-lapping valve mechanism, a handle for actuating said valve mechanism to effect a supply of fluid under pressure to effect an application of the brakes to a degree dependent upon the degree of movement of said handle, a retardation controller device, and means responsive to operation of said retardation controller device at a chosen rate of retardation for effecting the operation of said self-lapping valve mechanism independently of the position of said handle to modify the degree of application of the brakes.

5. In a vehicle brake system, in combination, a self-lapping valve mechanism, a manually operable element, means mechanically responsive to operation of said element for actuating said self-lapping valve mechanism to effect an application of the brakes to a desired degree, a retardation controller device, and means responsive to operation of said retardation controller device for subsequently effecting the operation of said self-lapping valve mechanism independently of the position of said manually operable element to effect a partial release of the brakes.

6. In a vehicle brake system, in combination, a brake cylinder, a brake controlling valve device having a movable element and a self-lapping valve mechanism for controlling the supply of fluid under pressure to said brake cylinder according to the degree of movement of said element, a retardation controller device, and means responsive to operation of said retardation controller device for also controlling said self-lapping valve mechanism independently of the position of said movable element.

7. In a vehicle brake system, in combination, a brake cylinder, a brake controlling valve device having a movable element and a self-lapping valve mechanism operative to control the supply of fluid under pressure to said brake cylinder according to the degree of movement of said element, a retardation controller device, and means responsive to operation of said retardation controller device at a chosen rate of retardation for operating said self-lapping valve mechanism independently of the movement of said movable element to effect a release of fluid under pressure from said brake cylinder.

8. In a vehicle brake system, in combination, a brake cylinder, a self-lapping valve mechanism having a supply valve and a release valve for controlling the supply of fluid under pressure to and its release from said brake cylinder, means for manually effecting and controlling the operation of said two valves, a retardation controller device, and means responsive to operation of said retardation controller device for controlling the operation of one of said two valves without affecting the operation of the other.

9. In a vehicle brake system, in combination, a brake cylinder, a self-lapping brake valve device for controlling the supply of fluid under pressure to and its release from said brake cylinder, said valve device comprising an element movable according to a desired degree of application of the brakes and valve means responsive to the degree of movement of said element for effecting a supply of fluid under pressure to said brake cylinder to a corresponding degree, fluid pressure operated means for modifying the operation of said valve means other than according to the movement of said element, and means operative according to the rate of retardation of the vehicle for controlling the operation of said fluid pressure operated means.

10. In a vehicle brake system, in combination, a brake cylinder, a self-lapping brake valve device having a movable abutment and a valve mechanism coacting therewith to control the supply of fluid under pressure to and its release from said brake cylinder, said movable abutment being subject to fluid at brake cylinder pressure to control the operation of said valve means, a retardation controller device, and means operative responsive to operation of said retardation controller device for modifying the response of said abutment to said fluid at brake cylinder pressure.

11. In a vehicle brake system, in combination, a brake cylinder, a self-lapping brake controlling valve device for controlling the supply of fluid under pressure to and its release from said brake cylinder, fluid pressure operated means for modifying the action of said self-lapping brake valve device, a retardation controller device operative in response to a chosen rate of retardation to effect a supply of fluid under pressure to said fluid pressure operated means, and operative upon a decrease in the rate of retardation below said chosen value to cut off the supply of fluid under pressure to said fluid pressure operated means, and means operative at all times to establish a restricted communication between said fluid pressure operated means and the atmosphere.

12. In a vehicle brake system, in combination, a brake cylinder, valve means for controlling the supply of fluid under pressure to and its release from said brake cylinder, manually operated means for effecting the operation of said valve means to supply fluid under pressure to said brake cylinder, fluid pressure operated means operable at brake cylinder pressure to actuate said valve means to lap the supply of fluid under pressure to said brake cylinder, a retardation controller device, and means responsive to operation of said retardation controller device at a chosen rate of retardation for causing said fluid pressure operated means to effect the operation of said valve means to reduce brake cylinder pressure.

CLYDE C. FARMER.